(No Model.)
J. P. BARRETT.
TELEPHONIC AND TELEGRAPHIC SYSTEM.
No. 284,595. Patented Sept. 11, 1883.
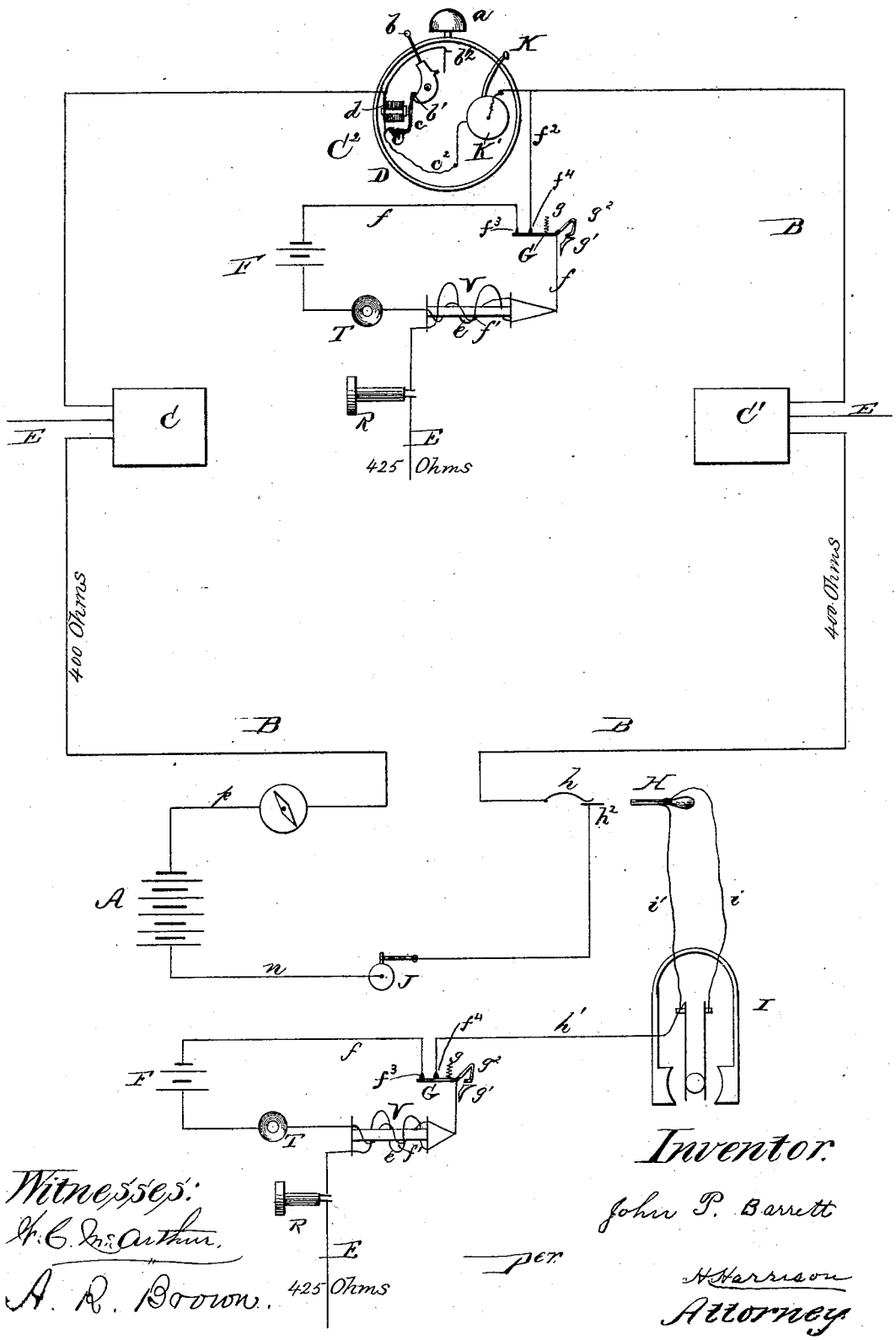
Witnesses:
H. C. McArthur
A. R. Brown
Inventor:
John P. Barrett
per H. Harrison
Attorney

UNITED STATES PATENT OFFICE.

JOHN P. BARRETT, OF CHICAGO, ILLINOIS.

TELEPHONIC AND TELEGRAPHIC SYSTEM.

SPECIFICATION forming part of Letters Patent No. 284,595, dated September 11, 1883.

Application filed October 3, 1882. (No model.)

*To all whom it may concern:*

Be it known that I, JOHN P. BARRETT, a citizen of the United States of America, residing at Chicago, in the county of Cook and State of Illinois, have invented Improvements in Telephonic and Telegraphic Systems, of which the following is a specification.

My invention relates to telephonic and telegraphic systems in which the calling or signaling is effected by currents over a normally-closed circuit, to which branch circuits, including transmitting and receiving instruments, are to be connected for regular communication.

The object of my invention is to facilitate the transmission of messages from outlying stations to a central office, to provide simple and easily-operated means for connecting and disconnecting the transmitting and receiving instruments to and from the main line, and to facilitate the transmission of call and answer signals between the outlying and central stations.

With these objects in view my invention consists in certain novel constructions and combinations of circuits and devices for connecting and operating the same, which will be readily understood from the following particular description, in connection with the accompanying drawing, which is a diagram illustrating a telephonic and telegraphic system according to my invention.

The letter A designates a main battery, situated at the main office or headquarters of the system. This battery is connected on one side to a galvanometer, P, by means of a wire, $p$, and on the other side to a registering apparatus by means of a wire, $n$.

The letter B indicates the main line, one terminal of which connects with the galvanometer and the other with the register, bringing both these instruments in the main circuit, which, at suitable intervals, includes the apparatus of outlying stations C, C', and $C^2$, the first two being simply indicated on the drawing, while the latter is shown in detail with a branch line, and transmitting and receiving instruments, and calling apparatus.

Any desired number of outlying stations may be included in the main circuit, and the line enters a box, D, at each station, and connects therein with an electro-magnet, as shown at $d$, and a signal-transmitting device, K', and thence passes out to the next station. The electro-magnet D is provided with a pivoted trigger-armature, $c$, which is retracted from the magnet by a spring, $c'$, which also connects the armature with the wire $c^2$ between the magnet and the signal-transmitting device K'. Upon the outside of the box is arranged a bell, $a$; and $b$ is a bell-hammer pivoted within the box, and provided with a projection, $b'$, arranged to engage with the trigger-armature $c$, which thus holds the hammer from contact with the bell. At each station is a transmitter, T, the usual current-varying devices of which are connected with the primary circuit, $e$, of an induction-coil, V, and with a local battery, F, the circuit $f$ of which is arranged to include said primary coil when desired. The secondary circuit, $f'$, of this induction-coil is connected at one end to a receiver, R, and thence over a wire, E, to the ground. At the other end of the induction-coil both its primary and secondary circuits are connected to a metallic lever, G, arranged to be held, on one side of its pivot, in contact with a terminal, $f^3$, of the local circuit $f$, and with a contact-terminal, $f^4$, of a branch wire, $f^2$, which leads from the main line. On the other side of its pivot the lever G is provided with an arm, $g^2$, which terminates a short distance above a bracket, $g'$, upon which the receiver is to be hung when not in use.

The receiver R is provided, as usual, with a hook or ring at its end, by which it is hung on the bracket, and when this ring or hook is inserted between the bracket and the arm $g^2$ the latter is forced upward and the lever on the other side of its pivot is depressed out of contact with the terminals $f^3$ and $f^4$, and thus breaks the transmitter primary circuit in which the lever is included, and also breaks the receiver branch, of which the wire $f^2$ and the lever form portions. The secondary of the induction-coil, in addition to its usual office, performs the function of a resistance-coil, as will be hereinafter explained.

In the main line at the central office is connected a finger-spring, $h$, having one end fixed and the other end arranged to bear against a contact-plate, $h^2$, which is also included within the main line.

The letter I indicates a magneto hand-generator, the opposite brushes of which are respectively connected by wires $i\ i'$ with the contact-plates of an ordinary cutting-in plug, H, so that the generator may be connected in the main line by inserting said plug between the spring $h$ and contact-plate $h^2$. From one brush of the generator also leads a branch wire, $h'$, which ends in a terminal, $f^4$, arranged in the same relation to a switch-lever, G, as in the outlying station already described, and the other transmitter and receiver circuits and connections are precisely the same as in said outlying station.

When a call is to be sent from a station to the main office, the lever K of the signal-transmitting device is to be operated for the purpose of actuating the circuit-breaking mechanism common in such boxes—such, for instance, as that shown in the patent of S D. Field, No. 189,717, granted April 17, 1877, and the signal transmitted is received in the main office on the register J, which, by a suitable mechanism, records the message upon a strip of paper automatically fed through the register. Such registers being well known, it is unnecessary to here give a detailed description thereof. The sender of the call, on releasing the lever K, removes his receiver from the bracket $g'$, and the spring $g$ draws the lever G into contact with the terminals $f^3$ and $f^4$, thus closing the circuit of the battery F through the transmitter and primary coil, $e$, and connecting the secondary coil and receiver to the main line. The operator at the main office, on receiving the call, places the plug H between the spring $h$ and plate $h^2$, and thus connects the hand-generator I in circuit with the main line, and upon operating said generator its circuit is added to the battery-circuit normally on the line, and so intensifies the magnet $d$ at the outlying station that it will overcome the tension of the spring $c'$, draw back the trigger-armature $c$, and release the bell-hammer, which is instantly thrown forward by a suitable spring, and strikes the bell $a$, this being the signal that the call is received. The operator at the main office then takes his receiver from its supporting-bracket $g'$, thereby connecting up his transmitter-battery, and placing his receiver and secondary coil in connection with the main line through the branch wire $h'$, wire $i'$, and plug H. The moment that the operation of the hand-generator I ceases the attractive force of the electro-magnet $d$ is lessened, the spring $c'$ retracts the armature $c$ and throws it out in contact with the bell-hammer, thus establishing a short circuit from the wire $c^2$ over the spring, the armature-trigger, bell-hammer, and wire $b^2$, with which said hammer comes in contact when released, so that the magnet is cut out of circuit and the resistance of its coils removed from the main line. This is the normal condition of these devices in boxes D at all the stations, and the act of pulling down the lever K throws back the hammer into engagement with the armature-trigger by means of connecting mechanism, (not shown,) thus placing the devices in condition for receiving an answer-back signal.

It will be understood that the bell $a$ is only used for the answer-back signal, original calls from the central office being received by means of devices within the casing K', which are fully described in the patent of Field, No. 189,717, heretofore referred to.

The various connections having now been made, as described, the transmitting and receiving instruments may be used in the usual manner for communication over the main line and branches between the outlying and central stations. When the communication is finished, the receivers are to be hung upon their brackets, thus breaking the transmitter-battery circuits and disconnecting the receivers from the main line.

As before stated, the secondary coils of the induction-coils V serve as resistance-coils, and they should each have a resistance preferably slightly greater than the resistance of the main line, in order that when connection is made from the main line to ground through the receiver branch a sufficient proportion of the main battery-circuit will be retained upon the main line to act in conjunction with the current from the hand-generator to properly energize the magnet $d$ for effecting the answer-back signal. For the purpose of illustration, it may be said that should the line have a resistance of four hundred ohms the secondary coil and branch connections should have, say, about four hundred and twenty-five ohms. These resistances are probably greater than would ever be given in practice, and are only given by way of illustrating their relative proportions.

It will be observed that when the receiver branch at a station connects the main line with the ground the two parts of the main line on opposite sides of the connecting-point afford two paths for the currents induced upon the main circuit by the transmitter, and become in effect a single conductor having half the resistance of the normal main line, and therefore by this method of constructing main lines and receiver branches the transmission of the feeble induced currents generated by the transmitter is very greatly facilitated.

It should be stated that the hand-generator I, instead of being of the usual reverse-current form, is constructed to deliver a continuous current, the direction or polarity of which on the main line should be the same as that of the main-line battery, so that instead of causing a series of strokes upon the signal-bell $a$, as would be the case if a reverse current were used, a single tap only is struck, this being found sufficient.

Having now described my invention and explained the mode of using the same, I claim—

1. In a telephonic or telegraphic system, the combination, with a normally-closed main line and main battery included therein and a branch to ground, of a resistance device included in said branch and having a resistance not less than that of the main line, substantially as described, and for the purpose set forth.

2. In a telephonic or telegraphic system, the combination, with a normally-charged main line, a branch to ground arranged to be connected with said main line, and a transmitter-battery circuit including the primary of an induction-coil, of the secondary of said induction-coil included in said branch, and having in connection with the branch a resistance not less than that of the main line, substantially as described.

3. In a telephonic or telegraphic system, the combination, with a normally-closed main line including one or more electric signaling-receiving devices, and a main battery included in said main line and having less electro-motive force than is required to operate said signaling device or devices, of an auxiliary magneto-electric generator arranged to be included in said main line for re-enforcing the battery-circuit, substantially as and for the purpose set forth.

4. In a telephonic or telegraphic system, the combination, with a normally-closed main line including electric signal receiving and transmitting devices at one or more outlying stations and an electric signal-receiver at a main or central station, of a main battery included in said main line and having sufficient electro-motive force to control the signal-receiver at the central station, but less than that required to operate the signal-receiving devices of outlying stations, and an auxiliary electric generator arranged to be included in the main line at will for re-enforcing the normal current thereon, substantially as described, and for the purpose set forth.

5. In a telephonic or telegraphic system, the combination, with a complete metallic main-line circuit and two or more branches connected to ground and including transmitting and receiving devices, of switches for connecting said branches to or disconnecting them from said main line, whereby any two branches may be connected through the main line, and when so connected the transmitter-currents from either branch will be provided with two short routes to the receiver of the other branch, as set forth.

6. The combination, with the main line and a ground branch arranged to be connected therewith, of the magneto-generator arranged to be connected in said main line and having said ground branch connected with one of its brushes, whereby when the said generator is connected to the line the ground branch is at the same time automatically connected to the main line, substantially as described.

In testimony whereof I affix my signature in presence of two witnesses.

JOHN P. BARRETT.

Witnesses:
W. C. McARTHUR,
FRANK JOHNSON.